3,030,770
VARIABLE SUPERSONIC INLET
Elliot D. Ranard, West Hartford, and Charles Edward Kepler, East Hartford, Conn., assignors to United Aircraft Corporation, East Hartford, Conn., a corporation of Delaware
Filed July 30, 1957, Ser. No. 675,212
3 Claims. (Cl. 60—35.6)

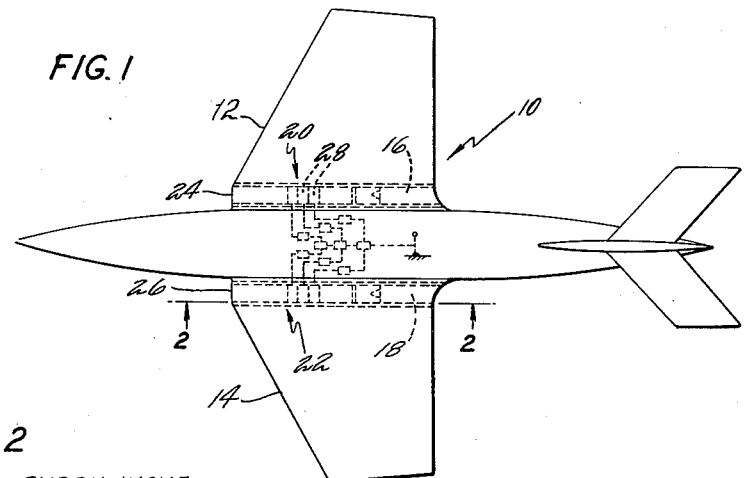
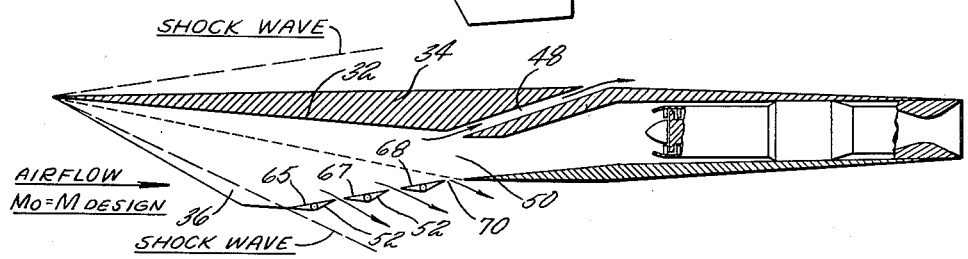
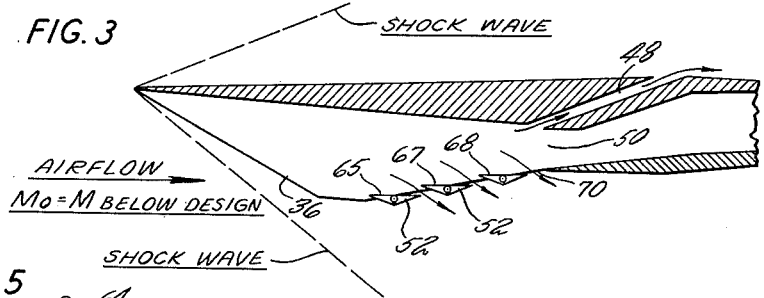
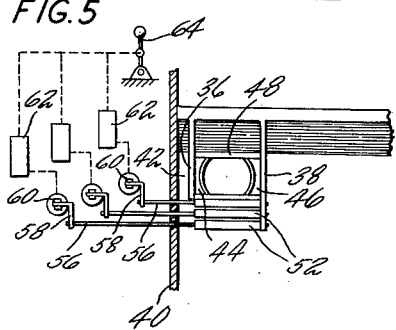
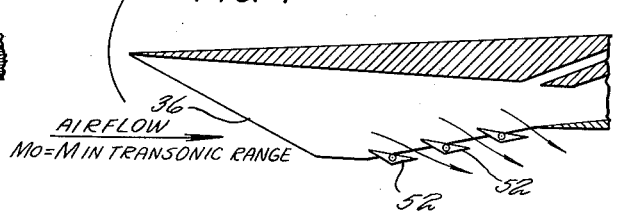
INVENTORS
ELLIOT D. RANARD
C. EDWARD KEPLER

United States Patent Office 3,030,770
Patented Apr. 24, 1962

This invention relates to high performance aircraft and more particularly to air inlets for such aircraft.

It is an object of this invention to provide an air inlet for high speed aircraft which inlet is capable of operating efficiently over a wide range of Mach numbers.

Another object of this invention is to provide an air inlet which has a variable contraction ratio and optimum pressure recovery over a large range of flight Mach numbers.

A still further object of this invention is to provide an inlet of the type described and having at least a portion of one wall of the inlet comprising a plurality of elongated members or slats of streamlined cross section with means for moving said slats to vary the openings therebetween and to thereby bleed air from inside to outside the inlet.

These and other objects of this invention will become readily apparent from the following detailed description of the drawing in which:

FIG. 1 is a schematic ilustration of an aircraft having the inlet of this invention;

FIGS. 2, 3, and 4 are schematic illustrations showing the inlet of this invention in cross section in the three different operative positions of the parts; and FIG. 5 is a schematic illustration indicating how the movable slat members can be actuated.

Referring to FIG. 1, an airplane is generally indicated at 10 as having high speed wings 12 and 14. Imbedded in the root portion of each of the wings is a pair of turbine type power plants 16 and 18. Air for the power plants is inducted by inlets 20 and 22, respectively. The inlets 20 and 22 have leading edge openings 24 and 26, respectively, which form one part of the inlets 20 and 22. The inlet 20, for example, includes at the bottom wall thereof a plurality of rotatable members 28 which are rotatable about axes running substantially transversely of the axis of flow to the inlet.

As better seen in FIG. 2, the inlet according to this invention includes a fixed upper wall 32 which is formed by a part of the wing structure 34. The sides of the inlet are formed by a wall 36 near the fuselage and an outboard wall 38 (FIG. 5). The wall 36, for example, is spaced away from the fuselage 40 as seen in FIG. 5 so that a boundary layer passage 42 is provided. The passage 42 gets rid of any boundary layer which builds up upstream along the fuselage. Any boundary layer which builds up on the side plates 36 and 38 may be bypassed via the passages 44 and 46 respectively.

Returning to FIG. 2 any boundary layer which builds up along the upper wall surface 32 of the inlet may be bled off via a passage 48 (see also FIG. 5). All of the boundary layer flow is bled off preferably either adjacent to or upstream of the throat 50 of the inlet. The bottom converging portion of the inlet is comprised of a plurality of slat-like elongated members 52 which extend across the inlet and whose spans extend transversely of the axis of flow through the inlet. The members 52 are pivotally mounted in the end walls 36 and 38 as better seen in FIG. 5. Each of the members 52 may include an operating arm 56 including a crank 58 outrided by a piston 60. Each piston 60 may be controlled by a suitable hydraulic valve 62 which in turn is selectively moved by a control lever 64. The amount of rotational movement of each of the slat-like members 52 may be programmed. In other words, the amount of relative rotation may differ for each adjacent slat.

As seen in FIG. 2, for speeds at the design Mach number the slats 52 have each of their major surfaces 65, 67, and 68 forming a substantially continuous converging wall portion. In the position shown in FIG. 2 a small amount of bleed may be provided between adjacent slat members or they may be in relative sealing relation. However, a certain amount of bleed will always be permitted adjacent the downstream end of the slat 68 to provide an opening 70 for bleeding a certain amount of boundary layer flow.

Each of the slats 65, 67, and 68 is of substantially streamlined shape so that they are aerodynamically balanced thereby requiring very little power to operate them. This makes the slats of this invention much more efficient than a single large wall which is movable to vary the contraction ratio of the inlet.

Where the relative oncoming air flow is somewhat below the design Mach number, the members 52 are moved to an intermediate position at a somewhat different angle relative to the axis of air flow through the inlet so that a large amount of air may be bled efficiently through the openings between the members 52. The air is bled efficiently because there is a very small reduction in velocity of the spill flow as it flows out through the slots into the free stream. Because this spillage process is so efficient, the drag which results from this spillage is therefore relatively small in value.

As seen in FIG. 4, at Mach numbers in the transonic range which are considerably below the design Mach number for the inlet, the members 52 are rotated to the position shown so that relatively large openings are formed therebetween to bleed a relatively large amount of flow from the inside to the outside of the inlet. Thus, the effective contraction ratio of the inlet can be varied to give an optimum pressure recovery over a large range Mach number. It will be apparent that as a result of this invention a very efficient inlet has been provided by having the members 52 substantially aerodynamically balanced. The static control forces acting on the members 52 are relatively small. Furthermore, the dynamic controlling forces are also small because the moment of inertia of the vanes or members 52 is small. As a result, this control can have a high rate of response where change in flight conditions occurs.

Although only one embodiment of this invention has been illustrated and described herein, it will become apparent that various changes and modifications may be made in the construction and arrangement of the various parts without departing from the scope of this novel concept.

What is desired to be secured by Letters Patent is:

1. A jet engine air inlet passage adapted to receive air at high Mach numbers, said inlet having a longitudinal axis and a duct portion defining a converging passage having an upstream opening and terminating in a downstream throat, said duct comprising a plurality of cooperating walls having substantially planar surfaces, a plurality of elongated members forming substantially the entirety of one of the walls of said duct and each substantially spanning said passage transversely, said one wall terminating upstream of said throat, means for rotating said members about substantially parallel vertically staggered axes to form elongated openings therebetween whereby said openings define an exhaust path having a substantial component parallel to said longitudinal axis, and means for controlling the rotation of said members to vary the shock pattern of the airstream and the amount of air being bled from inside to the outside of said one wall.

2. A jet engine inlet according to claim 1, wherein said elongated members are substantially aerodynamically balanced about their respective axes of rotation.

3. A jet engine inlet according to claim 1, including means for bleeding boundary layer flow from another of said plurality of walls.

References Cited in the file of this patent

UNITED STATES PATENTS

| | | |
|---|---|---|
| 2,589,945 | Leduc | Mar. 18, 1952 |
| 2,861,419 | Hausmann | Nov. 25, 1958 |
| 2,966,028 | Johnson | Dec. 27, 1960 |
| 2,975,587 | Rae | Mar. 21, 1961 |

FOREIGN PATENTS

| | | |
|---|---|---|
| 1,075,248 | France | Apr. 14, 1954 |
| 687,338 | Great Britain | Feb. 11, 1953 |